United States Patent [19]

Kuwayama et al.

[11] Patent Number: 5,098,354
[45] Date of Patent: Mar. 24, 1992

[54] ACCUMULATOR DEVICE OF HYDRAULIC FLUID CONTROL SYSTEM

[75] Inventors: Yoshinari Kuwayama, Tokoname; Jiro Nishiwaki, Anjo; Yoichi Hayakawa, Toyoake, all of Japan

[73] Assignee: Aisin AW Co., Ltd., Japan

[21] Appl. No.: 612,703

[22] Filed: Nov. 15, 1990

[30] Foreign Application Priority Data

Nov. 15, 1989 [JP] Japan .................................. 1-297166

[51] Int. Cl.⁵ .............................................. F16H 61/06
[52] U.S. Cl. .................................................... 475/129
[58] Field of Search .......................... 74/867; 475/129

[56] References Cited

U.S. PATENT DOCUMENTS

| 3,077,253 | 2/1963 | Lindsay | 475/129 X |
| 3,101,011 | 8/1963 | Tuck et al. | 74/732 |
| 3,138,969 | 6/1964 | Fisher et al. | 475/129 X |

Primary Examiner—Dirk Wright
Attorney, Agent, or Firm—Lorusso & Loud

[57] ABSTRACT

An accumulator fluid control system for a hydraulic servo in a vehicular automatic transmission includes an accumulator having a cylinder, a piston, a return spring, a chamber disposed in the cylinder, a first and second input ports connected to a first passage, an output port connected to a second passage, and a check valve for controlling the connection between the first and second passages through the second input port.

4 Claims, 7 Drawing Sheets

Fig. 5

| | | Clutch | | | | Brake | | O.W.C | | Gear ratio |
|---|---|---|---|---|---|---|---|---|---|---|
| | | C0 | C1 | C2 | C3 | B1 | B2 | F0 | F1 | |
| P | | × | × | × | × | × | × | × | × | |
| R | V≤7 | × | × | ○ | × | × | ○ | × | × | 2.769 |
| | V>7 | × | × | ○ | × | × | × | × | × | |
| N | | × | × | × | × | × | × | × | × | |
| D | 1ST | × | ○ | × | × | × | × | ○ | ○ | 2.807 |
| | 2ND | × | ○ | × | × | ○ | × | ○ | × | 1.479 |
| | 3RD | ○ | ○ | × | ○ | ◎ | × | ○ | × | 1.000 |
| | 4TH | ○ | ○ | × | × | ○ | × | × | × | 0.735 |
| 2 | 1ST | × | ○ | × | ○ | × | × | ○ | ○ | |
| | 2ND | × | ○ | × | ○ | ○ | × | ○ | × | |
| | 3RD | ○ | ○ | × | ○ | ◎ | × | ○ | × | |
| | (3RD) | ○ | ○ | × | ○ | ◎ | × | ○ | × | |
| 1 | 1ST | × | ○ | × | ○ | × | ○ | ○ | ○ | |
| | 2ND | × | ○ | × | ○ | ○ | × | ○ | × | |
| | (2ND) | × | ○ | × | ○ | ○ | × | ○ | × | |
| | (1ST) | × | ○ | × | ○ | × | ○ | ○ | ○ | |

| Remarks | | | |
|---|---|---|---|
| ○ | Engage | | Lock |
| × | Disengage | | Free |
| ◎ | B-1 brake is disengaged by B-1 release pressure | | |

ACCUMULATOR DEVICE OF HYDRAULIC FLUID CONTROL SYSTEM

FIELD OF THE INVENTION

The present invention relates to an accumulator device of an hydraulic fluid control system, more specifically an accumulator device of an hydraulic fluid control system in an automatic transmission for a vehicle.

Usually, an accumulator for regulating the pressure of a hydraulic fluid supplied to a hydraulic servo of an automatic transmission has a check ball valve 126 disposed in an hydraulic fluid passage for supplying a hydraulic fluid in cooperation with an accumulator as shown in FIG. 6.

The check ball valve 126 has a small orifice 127 and a large orifice 129 for supplying a hydraulic fluid in cooperation with the accumulator therethrough.

Therefore, when a hydraulic fluid is supplied in the passage 116, the hydraulic fluid is slowly supplied to the hydraulic servo 130 through the accumulator 125 by way of the small orifice 127 in order to engage a clutch disk 131 without causing any engaging shock. The hydraulic servo has a clutch disk 131, a piston 113, and a return spring 111 as shown in FIG. 6.

When the clutch disk is 131 is disengaged, the large orifice 129 is kept open by preventing a hydraulic fluid from being supplied to the passage, thereby enabling exhaust of hydraulic fluid from the hydraulic servo 130.

Since check ball valve 136 has a check ball disposed in the passage formed in the piston 113, it is easy to exhaust a hydraulic fluid from the hydraulic servo through the valve 136 when the clutch disk is disengaged.

A hydraulic fluid in the piston chamber, that is, is not exhausted through the passage 117, 116 when the clutch disk 131 of the hydraulic servo is disengaged disengaged state, because of the centrifugal force on the hydraulic fluid in the piston chamber 1 due to rotation of clutch drum 130.

In order to exhaust hydraulic fluid the chamber 132, the check ball 136 is disposed in the passage 133 formed in the piston 113.

However, the passage 133 can't be closed by the check ball 135 before the piston chamber 132 is filled with hydraulic fluid because the check ball 135 is pushed radially outward by the centrifugal force generated by rotation of the clutch drum. The clutch disk 131 is often kept in the state of disengagement because the rate of discharge of hydraulic fluid exhausted from the chamber through the check valve 136 of the hydraulic servo 130 is larger than the rate at which hydraulic fluid is supplied to the chamber through the small orifice 127.

As the result, the predetermined speed stage is not established because of the disengagement of the clutch disk 131.

As shown in FIG. 7, the hydraulic fluid supplied to the hydraulic servo through the small orifice 127 delays the engagement of the clutch disk 131 because it takes so much time to fill the hydraulic fluid for moving the piston 113 through one stroke.

As the result, the starting timing for engaging the clutch disk is delayed as shown in FIG. 7.

SUMMARY OF THE INVENTION

The object of an present invention is to provide the accumulator device for promptly engaging a hydraulic servo, as shown in FIG. 7, i.e. without allowing the clutch disk to remain disengaged in spite of a hydraulic fluid to the chamber.

In order to overcome the above problem, the present invention provides the following structure as shown in FIG. 1:

Briefly, the accumulator device 23 of the hydraulic fluid control system has a cylinder 110, a return spring disposed in the cylinder 110 and a piston 113 operated according to the balance between the hydraulic pressure in the passage 112 and the return spring.

The accumulator further includes, a chamber 115 of a volume which varies according to the position of the piston 113. A first supplying passage 116 connects the accumulator 23 with a hydraulic fluid source and a second supplying passage 117 connects with a hydraulic servo. First and second input ports 119, 120 are disposed between the first supplying passage and the second supplying passage, a check ball is disposed between the first supplying passage and the second input port, an output port is disposed between the chamber 115 and the second supplying passage, and an arm 123 is connected to the piston 113 for engaging or disengaging the check ball to or from the second input port 120 according to hydraulic pressure in the chamber 115.

In the present invention, when a hydraulic fluid is supplied to the first supplying passage 116, the input port 120 is open because the arm 123 prevents the check ball 122 from closing the second input port 120.

At that time, hydraulic fluid supplied from the first supplying passage to the chamber 115 is supplied to the second supplying passage through the first input port 119 and the second input port 120 with the check ball 122 via the output port 121.

When the quantity of the hydraulic fluid supplied to the hydraulic servo C-O (shown in FIG. 2) is more than that leaked through passage 145, which leaks through the check valve 146 in the passage 145, the hydraulic fluid pressure in the hydraulic servo C-O causes the clutch disk 148 to engage through the piston 147. Therefore, the clutch promptly engaged as shown FIG. 7, without allowing the clutch disk to remain disengaged due to the centrifugal force on the hydraulic fluid in the hydraulic servo C-O.

Accordingly, the predetermined shift stage is not delayed by operation of the piston 148 in the hydraulic servo C-O.

BRIEF DESCRIPTION OF THE DRAWINGS

FIG. 5 is an operation diagram of the gear train;

DESCRIPTION OF THE PREFERRED EMBODIMENT

An embodiment of the present invention is described in the following with referance to the drawings.

Figure 2:
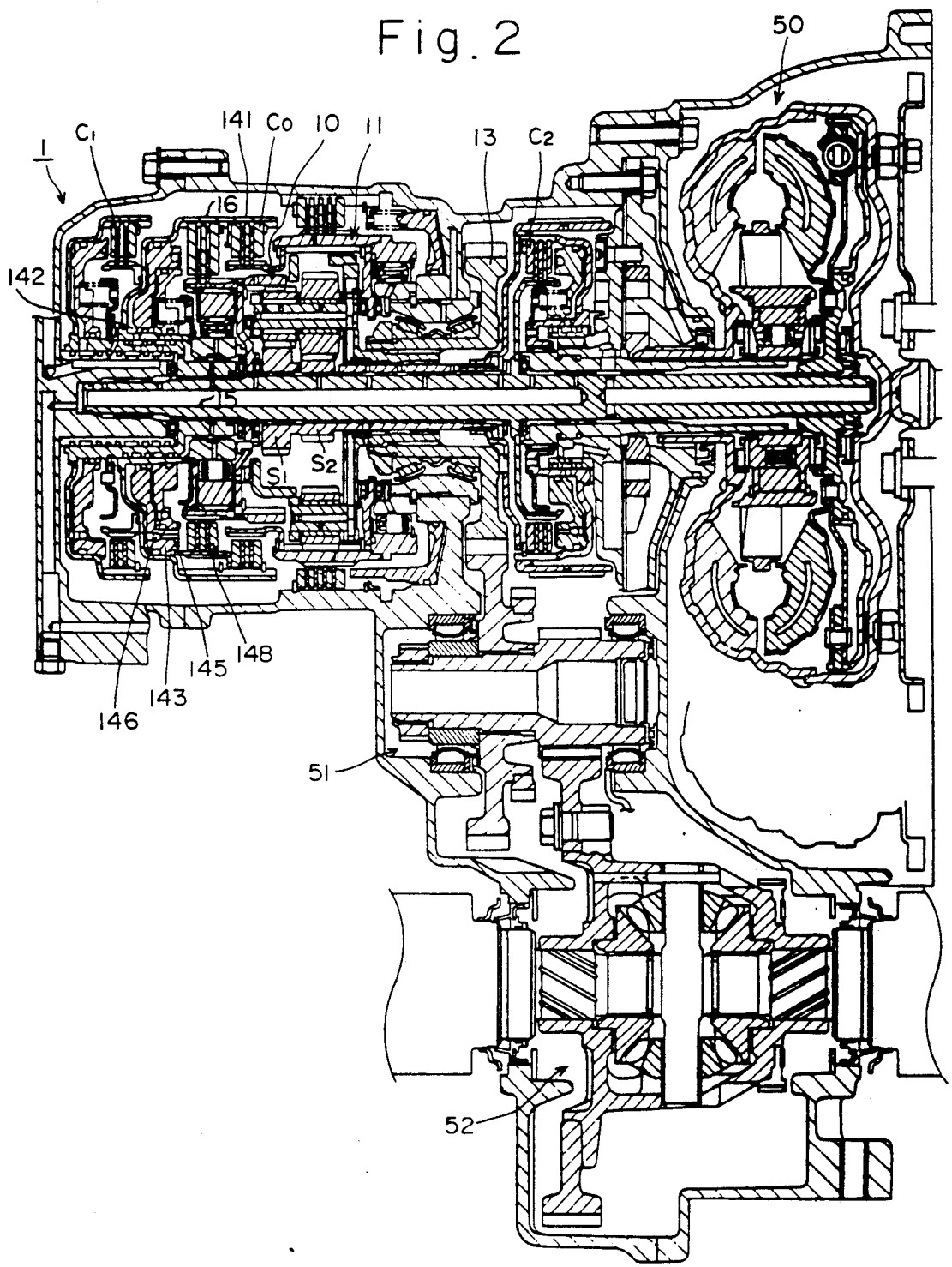
FIG. 2 is a sectional view of an automatic transmission in accordance with the present invention.
Figure 3:
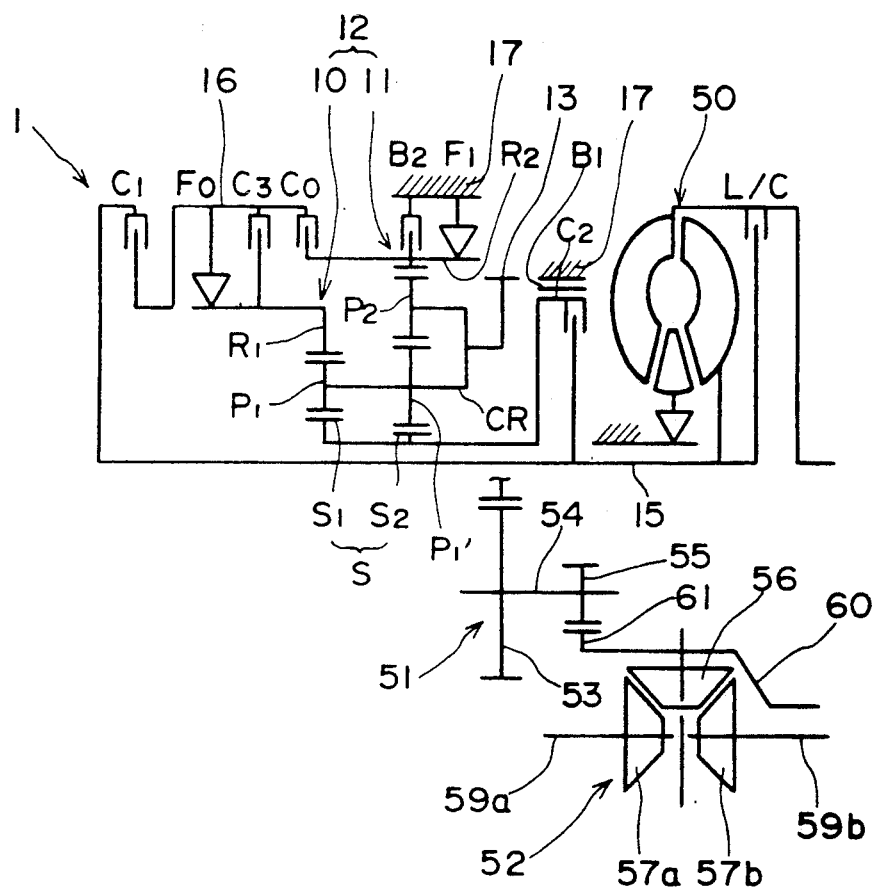
FIG. 3 is a schematic diagram of a gear train of the automatic transmission accoding to the present invention.

FIG. 2 is a sectional view of an automatic transmission according to the present invention, and FIG. 3 is a schematic diagram of a gear train of the automatic transmission according to the present invention.

An automatic transmission 1 has a torque converter 50 with a lock-up clutch device, a reduction gear mechanism 51, and a differential device 52. The 4-speed gear transmission 1 has a planetary gear unit 12 with a single planetary gear set 10 and a dual planetary gear set 11. Sun gears S1, S2 of the planetary gear unit 12 are integrated and together constitute an integrated gear S. Furthermore, pinions P1, P1' are integrated to form the equivalent of one long pinion. A corrier CR supports a pinion P2 geared with ring gear R2 (large ring gear) and the pinions P1 and P2 are integrated.

An input shaft 15, which extends from an output member of a torque converter 50 is connected with a connecting member 16 through a clutch 16 and connected to a sun gear S through a second clutch C2.

A third clutch C3 and a second one way clutch F0 are disposed between a connecting member 16 and a ring gear R1 of a single planetary gear 10 (small ring gear).

A fourth clutch C0 is disposed between the connecting member 16 and the large ring gear R2.

A sun gear S is connected to a first brake B1 in the form of a band brake.

A second brake B2 and a first one way clutch F1 are disposed between a large ring gear R2 and a case 17.

A carrier CR is connected to an output gear 13 located in the center of the automatic transmission.

A reduction gear mechanism 51 has a counter shaft 54 rotatably supported by a case 17.

A large gear 53 and a small gear 55, which are meshed with the output gear 13; are mounted on the shaft 54.

A differential device 52 has a differential pinion 56 and left and right side pinions 57a, 57b which are connected to left and right front axles 59a, 59b.

A differential pinion 56 is supported by a differential carrier 60 which is rotatably supported by case 17.

A ring gear 61 meshed with the small gear 55 is disposed in the differential carrier 60.

First brake B1, through it is not shown in any figures, has a band fixed to the case at one end thereof. The band is disposed around a drum connected to sun gear S and for a piston rod of a hydraulic servo of brake B1.

Figure 4:
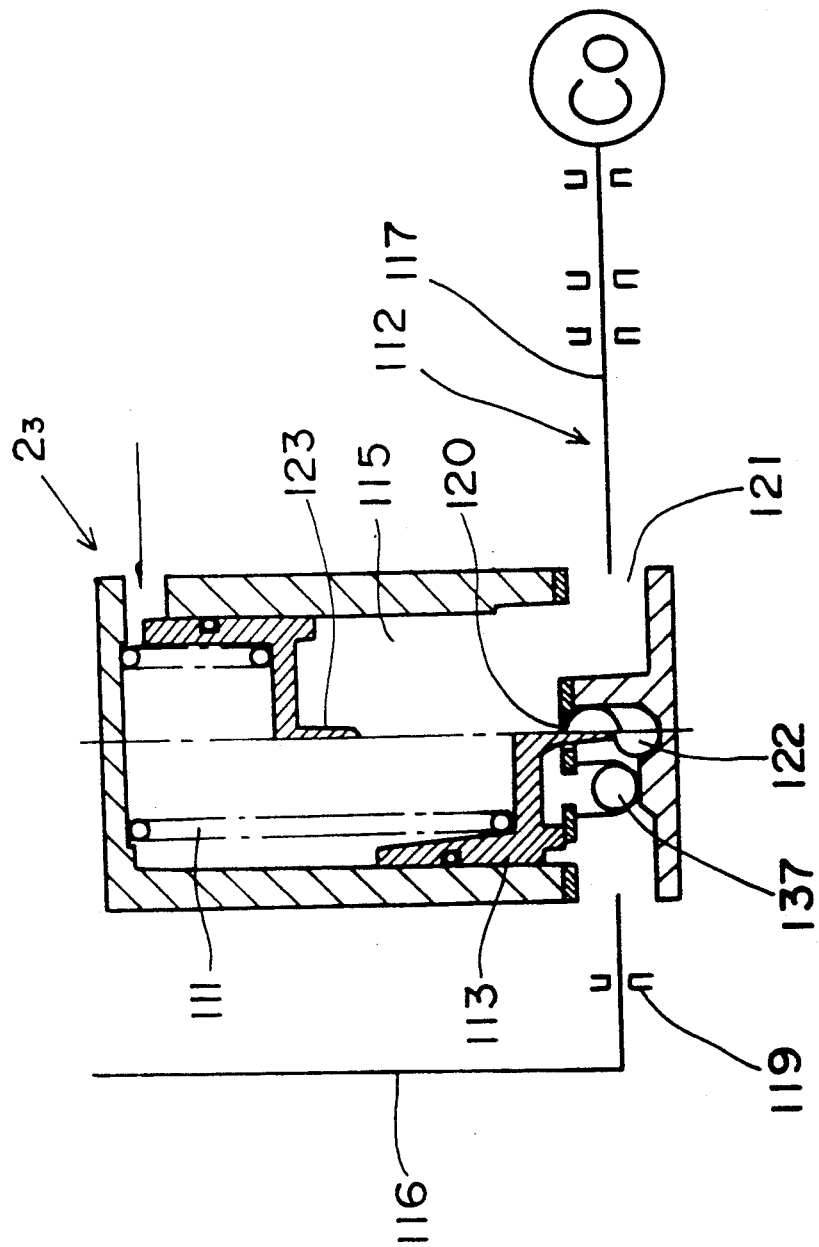
FIG. 4 is a sectional view of another embodiment related to an accumulator device according to the present invention.
Figure 6:
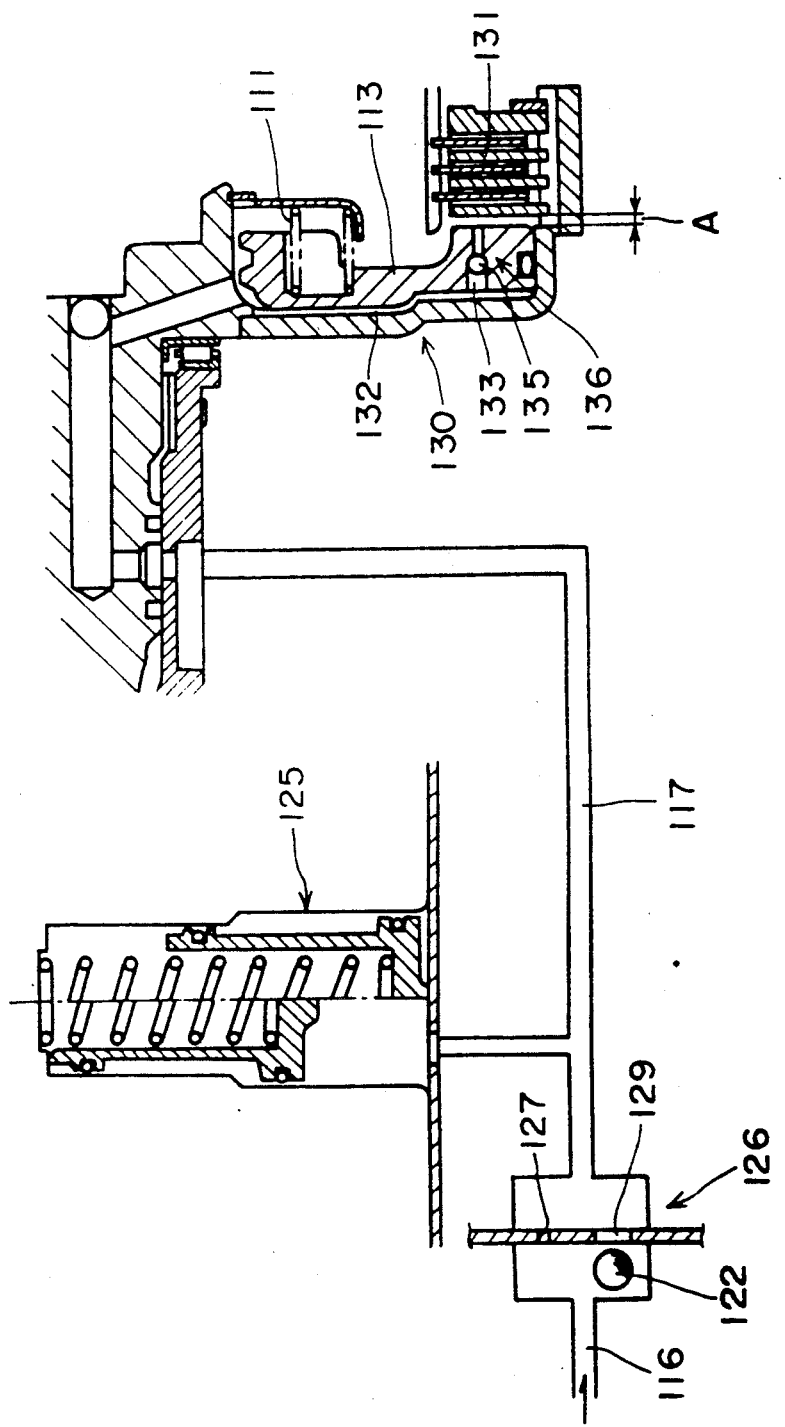
FIG. 6 is a sectional view of a prior art accumulator and servo.

FIG. 4 shows an operation diagram of the gear train.

When a manual valve is shifted the D range position the shift gear stage is set to the first speed stage line pressure is supplied to a first hydraulic servo of first clutch C1 through a manual valve without supplying any other hydraulic servos.

The first clutch C1 is engaged and first and second one way clutches F1, F0 are engaged in order to establish first speed stage. The rotation of input shaft 15 is transmitted to small ring gear R1 through first clutch C1 and second one way clutch F0. Since the first one way clutch F1 prevents the large ring gear from rotating, the rotational speed of carrier CR is much reduced by sun gear S and a drum connected thereto and the reduced rotation is transmitted to an output gear 13.

The rotational speed of the gear 13 is reduced by a reduction gear set 51, and the rotation of the gear 13 is transmitted to the left and right axle shafts 59a, 59b through a differential device 52.

To establish the second speed stage besides the engagement of a first clutch C1, first brake B1 is engaged and second one way clutch F0 is engaged in order to establish second speed stage.

The rotation of input shaft 15 is transmitted to small ring gear R1 through first clutch C1 and second one way clutch F0. Since first brake B1 prevents sun gear S from rotating, the rotation of the small ring gear R1 is transmitted to carrier CR by racing large ring gear R2. When 1-2 shift change is stablished, the first one way clutch F1 prevents an automatic transmission from yielding a shift shock by having an one way clutch F1 over-running.

Third speed stage is established, by engagement of first clutch C1, third clutch C3, and fourth clutch C0 and disengagement of first brake B1. The rotation of input shaft 15 is transmitted to small ring gear R1 through second one way clutch F0 insert third clutch C3 and to a large ring gear R2 through a fourth clutch C0. As a result, rotation of input shaft 15 is transmitted to output gear 13 through carrier CR by rotating planetary gear unit 12 in the state of a direct coupling.

Fourth speed stage is established, by the engagement of first clutch C1, fourth clutch C0 and first brake B1 and by disengagement third clutch C3.

The rotation of input shaft 15 is transmitted to large ring gear R2 through fourth clutch C0.

Since first brake B1 prevents sun gear S from rotating, the rotation of a large ring gear R2 is transmitted to output gear 13 through carrier CR by racing ring gear R1. At that time, third clutch C3 is disengaged in accordance with the state of first brake B1.

Even if the third clutch C3 is disengaged earlier, the third speed stage is kept by a second one way clutch F0. A shift shock is prevented by delaying engagement of first brake B1.

When the manual valve is shifted to the R range position, the shift stage is set to reverse speed stage.

When a vehicle speed is lower than a predetermined value, for example 7 km/H, that is a substantially halted state, second clutch C2 and second brake B2 are engaged.

The rotation of a input shaft 15 is transmitted to a sun gear S through second clutch C2.

Since second brake B2 prevents large ring gear R2 from rotating, the rotation of the sun gear S is transmitted to the carrier CR as a reverse rotation by racing small ring gear R1 in reverse rotation.

As the result, the reverse rotation is transmitted to output gear 13.

When the vehicle speed is higher than a predetermined value, for example 7 km/H, that is the state of slow running, the second brake B2 is not engaged because no hydraulic fluid is supplied to the servo of brake B1. As the result, the reverse speed stage is not established.

When the manual valve is shifted to a third range position, four speed stage is not established.

When a manual valve is shifted to a second range position, a input shaft 15 is connected to a small ring gear R1 through third clutch C3 in order to provide engine braking without having the vehicle running slowly through second one way clutch F0 overrunning during coasting.

When the manual valve is shifted to first range, third and fourth speed stages are not established.

Figure 1:
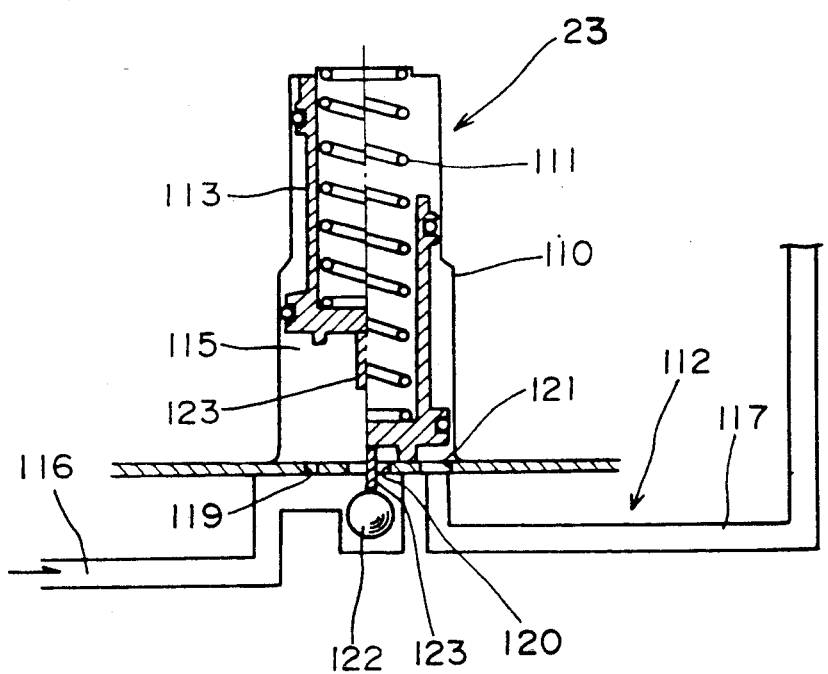
FIG. 1 is a sectional view of an accumulator device according to the present invention.

An embodiment of the accumulator system of the present invention, including an accumulator 23 for the hydraulic servo is shown in FIG. 1.

The drum 141 for the hydraulic servo C-O is, as shown in FIG. 5, directly engaged to the input shaft 15 because the clutch C1 is always engaged during forward shifting stages.

Accordingly, the hydraulic fluid in the chamber 142 of the hydraulic servo C-O is subject to a centrifugal force generated by rotation of the drum 141.

The hydraulic fluid in the chamber 142 easily leaks through the check valve 143 so that the hydraulic fluid supplied to the chamber 142 through the orifice 119 of the accumulator 3 can't engage the clutch CO.

Referring to the FIG. 5, it can be seen that first gear stage in D range is set when the clutch C-O is not engaged during the transition from second gear stage to third gear stage in D range.

The accumulator of the present invention in combination with the hydraulic servo CO facilitates a shift from second gear stage to third gear stage. The accumulator 23 for the hydraulic servo C-O in an automatic transmission, where the clutch C-O is rotated in all the forward gear stages, has a cylinder 110, a return spring 111 disposed in the cylinder 110, a piston 113 operating according to the balance between the hydraulic fluid pressure in the passage 112 and the force of the return spring 111, and a chamber 115 in which a volume of the hydraulic fluid varies according to the position of the piston 113.

The passage 112 includes the first supplying passage 116 and the second supplying passage 117 connected to the hydraulic servo C-O. The accumulator 23 is connected to the first supplying passage 116 through the first input port 119 and the second input port 120 (with a check valve) and to the second supplying passage 117 through the output port 121. The piston carries an arm 123, which operates to connect the passages through the check valve 122 when the valve of the hydraulic fluid pressure in the chamber 115 is lower than a predetermined value.

In the present invention, when a hydraulic fluid is supplied with the first supplying passage 116, the input port 120 is open because the arm 123 prevents the check ball 122 from closing the second input port 120.

At that time, a hydraulic fluid supplied from the first supplying passage to the chamber 115 is supplied to the second supplying passage through the first input port 119 and the second input port 120 via the output port 121.

Figure 7:
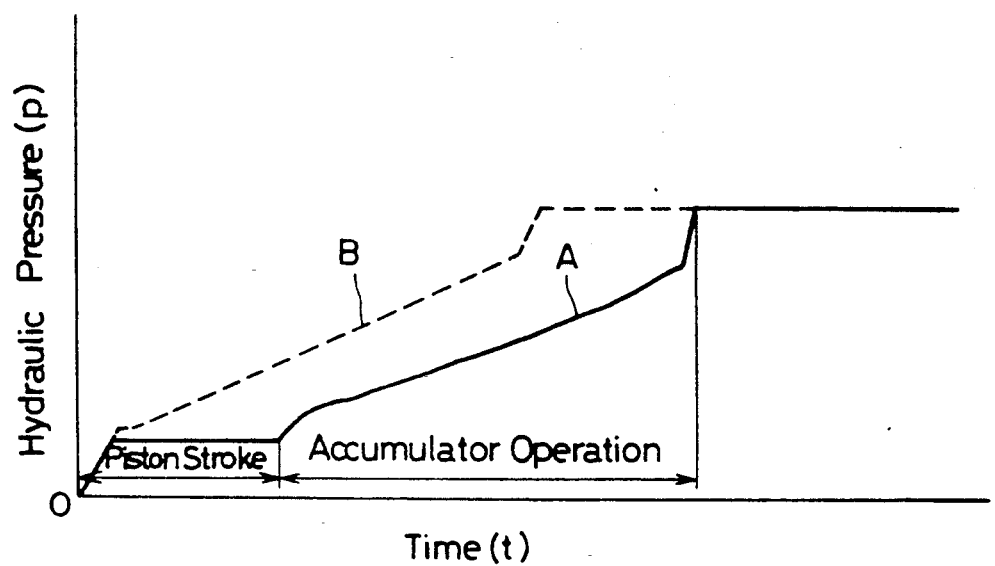
FIG. 7 is a comparing diagram the operation of the usual accumulator with that of the present invention.

When the quantity of the hydraulic fluid supplied to the hydraulic servo C-0 (shown in FIG. 2) is more than that leaked from passage 145 through the check valve 146, the hydraulic fluid pressure in the hydraulic servo C-0 causes the clutch disk 148 to engage through operation of the piston 147. Therefore, the clutch is engaged "promptly" as shown FIG. 7, without allowing the clutch disk to remain disengaged by the due to centrifugal force operating on the hydraulic fluid in the hydraulic servo C-0.

Accordingly, establishment of a predetermind shift stage is not subject to the delay of the piston 148 operation in the hydraulic servo C-0.

In order to smoothly disengage the clutch CO as shown in FIG. 4, an output port 137 may be provided in the accumlator 115, which is connected to the first supplying passage 116.

We claim:

1. An accumulator hydraulic fluid pressure control system for a vehicle automatic transmission having an input shaft and a plurality of friction engagement devices for establishing various forward speed stages including a first forward speed stage, said system comprising:

a hydraulic servo comprising a drum connected to the transmission input shaft in all forward speed stages, said hydraulic servo outputting hydraulic fluid, at a pressure in accordance with centrifugal force generated by rotation of said drum, for engagement of at least one forward speed stage other than the first speed stage;

an accumulator;

a first supply passage connecting said accumulator to a hydraulic fluid source;

a second supply passage connecting said accumulator to the hydraulic servo for transmitting hydraulic fluid at said pressure;

said accumulator including:
a cylinder;
a piston axially slidable in said cylinder;
a return spring disposed between the cylinder and the piston;
a chamber of varying volume defined in the cylinder by the piston;
first and second input ports providing fluid communication between said chamber and said first supply passage;
an output port providing fluid communication between said chamber and said second supply passage; and
first check valve means for controlling the fluid communication between said first and second supply passages through said second input port; and second check valve means for exhausting hydraulic fluid from said hydraulic servo.

2. A pressure control system according to claim 1, further comprising an arm connected to said piston for insertion through said second input port, and wherein said first check valve means comprises:

a first check ball disposed between said first supply passage and said second input port for engagement by said arm, thereby dislodging said first check ball from said second input port.

3. An accumulator device according to claim 1 wherein the hydraulic servo operates a frictional engagement device to establish a one to one gear ratio.

4. An accumulator hydraulic fluid pressure control system for a hydraulic servo in a vehicle automatic transmission, said system comprising:

an accumulator;
a first supply passage connecting said accumulator to a hydraulic fluid source;
a second supply passage connecting said accumulator to the hydraulic servo;
said accumulator including:
a cylinder;
a piston axially slidable in said cylinder and an arm connected to said piston;
a return spring disposed between the cylinder and the piston;
a chamber of varying volume defined in the cylinder by the piston;

first and second input ports providing fluid communication between said chamber and said first supply passage, said arm extending through said second input port;

an output port providing fluid communication between said chamber and said second supply passage; and first check valve means for controlling the fluid communication between said first and second supply passages through said second input port, said first check ball means comprising a first check ball disposed between said first supply passage and said second input port for engagement by said arm, thereby dislodging said first check ball from said second input port; and second check valve means for exhausting hydraulic fluid from the servo without supply of hydraulic fluid to the servo, said second check valve means comprising a third port disposed between said chamber and said first supply passage and a second check ball disposed between the first supply passage and the third port.

* * * * *

UNITED STATES PATENT AND TRADEMARK OFFICE
CERTIFICATE OF CORRECTION

PATENT NO. : 5,098,354
DATED : March 24, 1992
INVENTOR(S) : KUWAYAMA et al

It is certified that error appears in the above-identified patent and that said Letters Patent is hereby corrected as shown below:

Col. 1, line 41, after "fluid" insert --from--;

line 66, delete "an" insert --the-- and delete "the", second instance, insert --an--.

Col. 2, line 2, after "fluid" insert --being supplied--; and line 43, after "clutch" insert --is--.

Col. 3, line 55, after "shifted" insert --to--;

line 56, delete "line" insert --. Line--.

UNITED STATES PATENT AND TRADEMARK OFFICE
CERTIFICATE OF CORRECTION

PATENT NO. : 5,098,354

DATED : March 24, 1992

INVENTOR(S) : KUWAYAMA et al

It is certified that error appears in the above-identified patent and that said Letters Patent is hereby corrected as shown below:

Col. 4, line 5, after "stage" insert a comma --,--;

line 18, after "established" delete the comma ",";

line 47, delete "a", second instance;

line 64, delete "a", both instances.

Col. 5, line 5, after "servo" insert a comma --,--.

Signed and Sealed this

Tenth Day of August, 1993

*Attest:*

MICHAEL K. KIRK

*Attesting Officer*     *Acting Commissioner of Patents and Trademarks*